Patented Nov. 22, 1927.

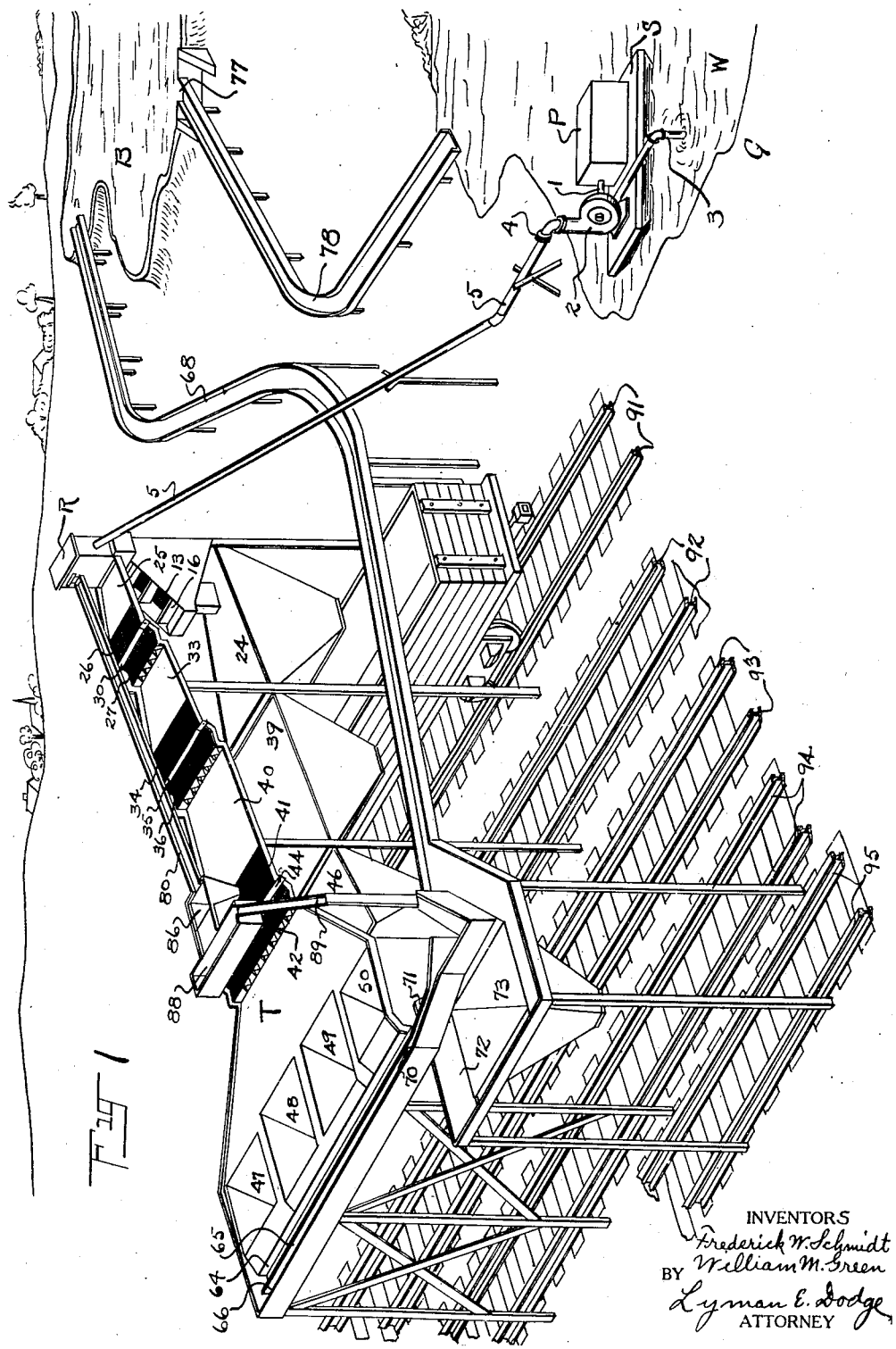

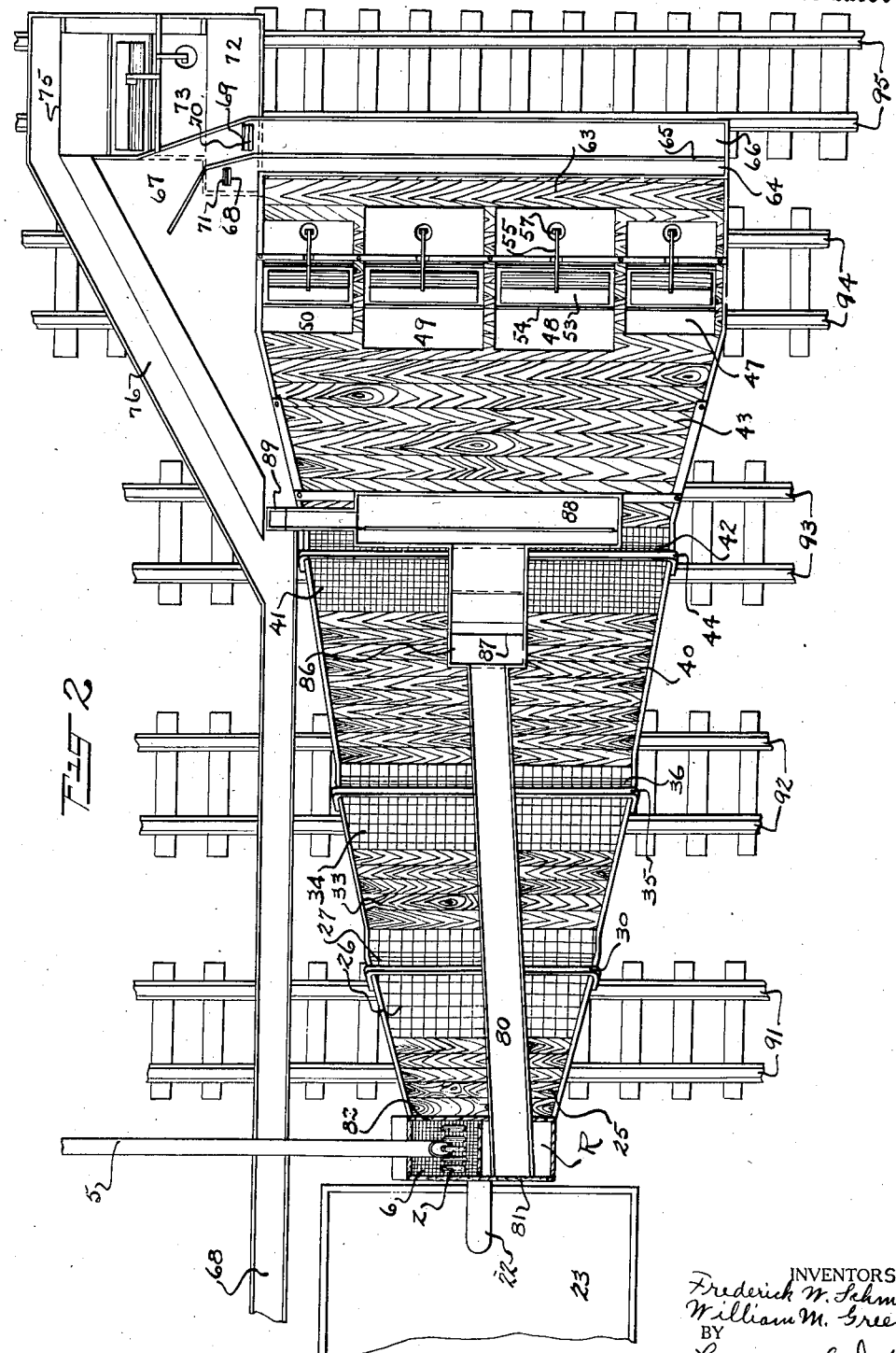

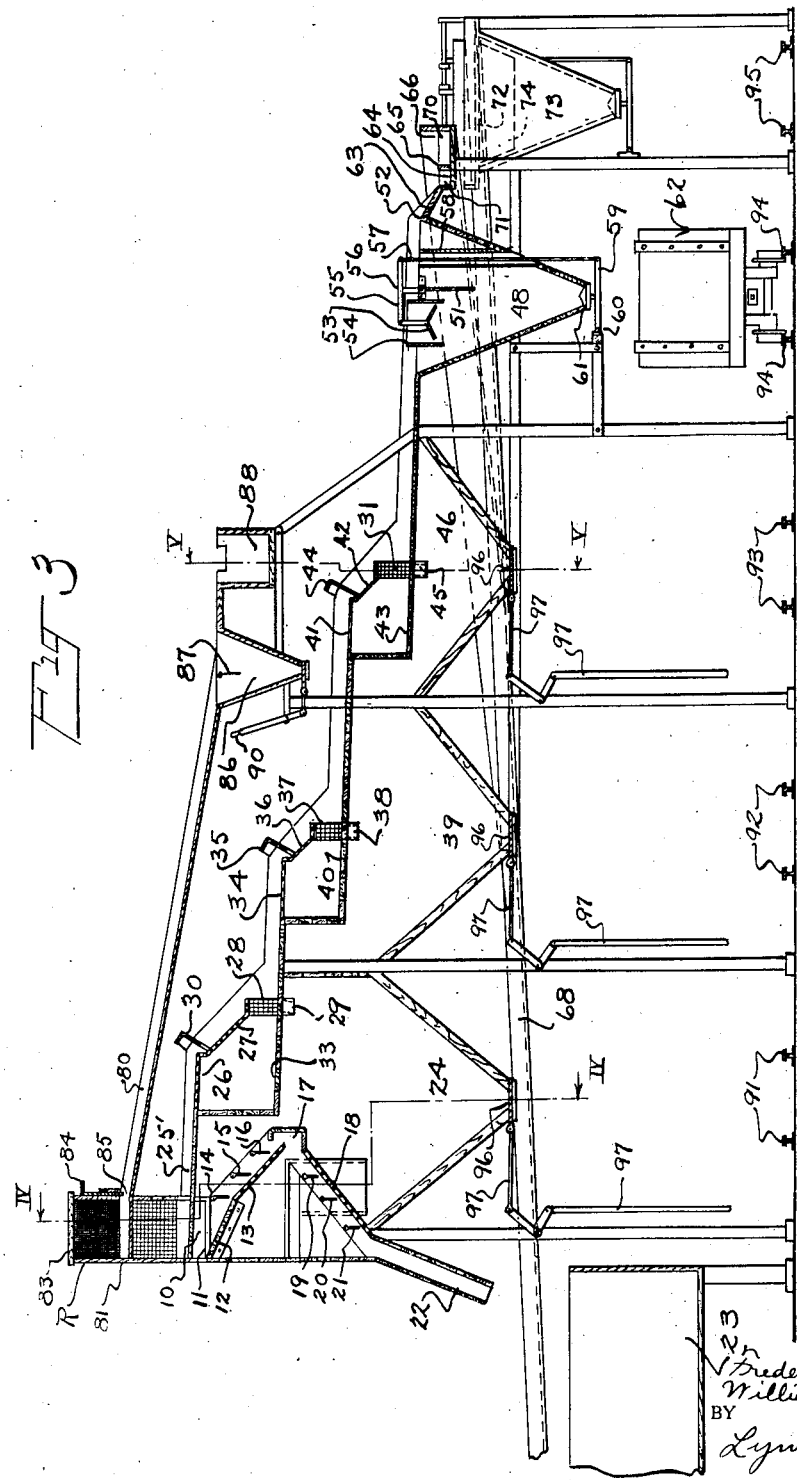

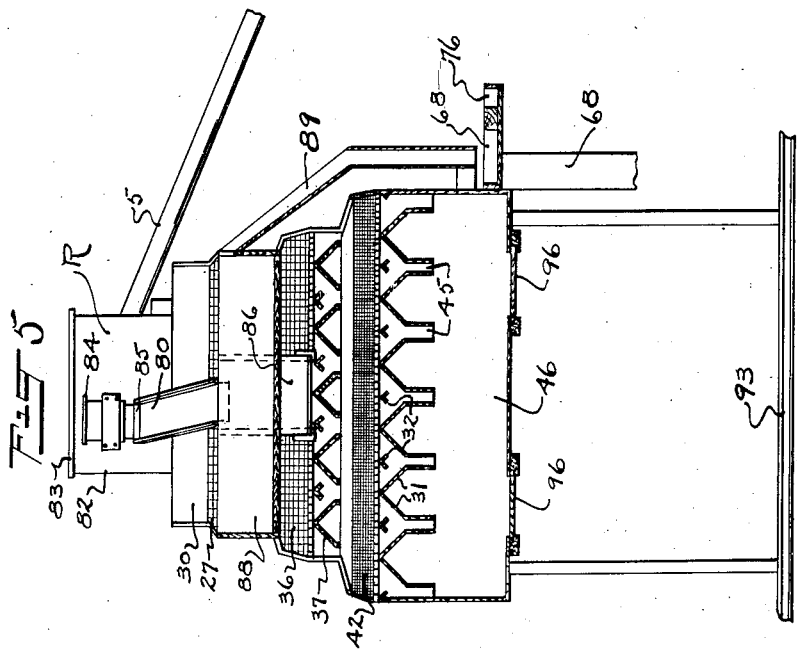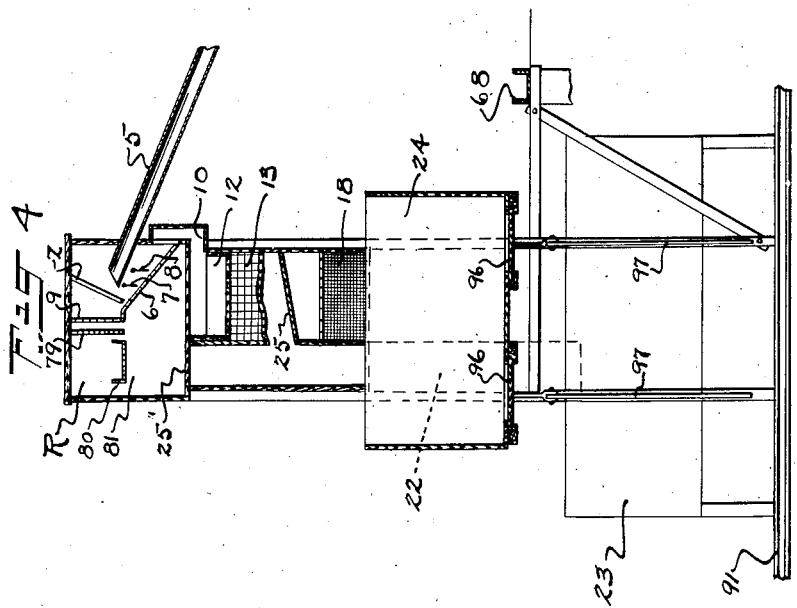

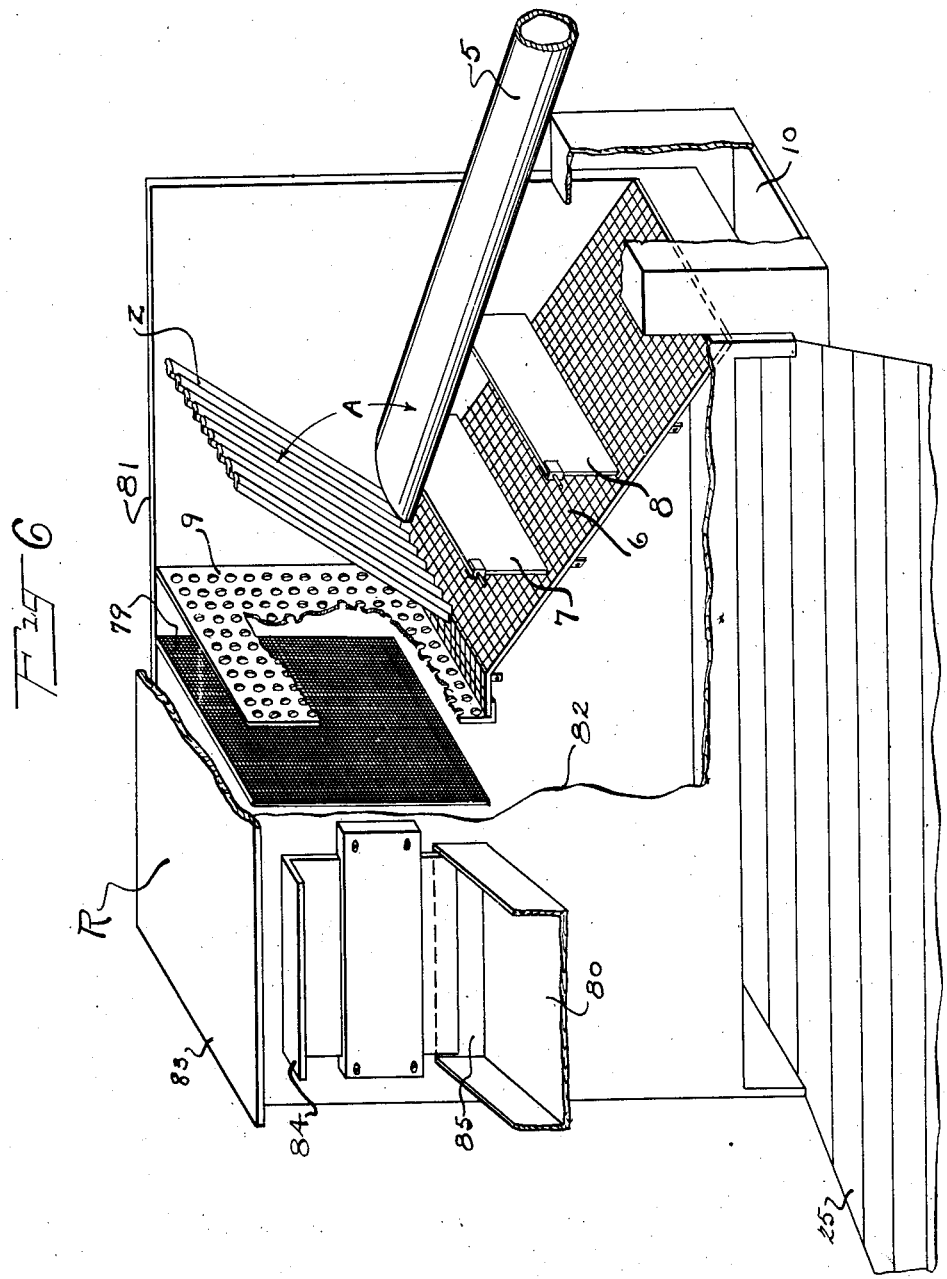

1,650,239

UNITED STATES PATENT OFFICE.

FREDERICK W. SCHMIDT AND WILLIAM M. GREEN, OF MORRISTOWN, NEW JERSEY.

HYDRAULIC CLASSIFIER AND SEPARATING PROCESS.

Application filed September 14, 1923. Serial No. 662,624.

This invention relates to processes and apparatus for material separating and sorting, particularly for separating loam and sand from gravel as it occurs naturally in the well known gravel banks or glacial moraines and also sorting the gravel and also the sand, and more especially for separating and sorting of the kind described accomplished hydraulically.

A primary object of this invention is to provide a process of the nature indicated whereby the various sizes of gravel in an ordinary gravel bank may be separated from sand and loam and may be sorted into several different masses each containing bodies varying in size only between fixed limits, which masses will contain bodies washed substantially clean and free from sand and loam.

A further object of the invention is to provide a process whereby the sand and loam separated from the larger bodies of the gravel may be substantially separated one from the other and the sand separated into masses of substantially different relative coarseness.

A further object of this invention is to provide a process of the nature indicated whereby gravity alone will act as the motive force for the mass of mixed loam, sand and gravel, after the mass has been once elevated to the receiving station of the apparatus which we have contrived for carrying out our process, until the separated and sorted material is actually delivered into vehicles for transportation to the point of use.

A further object of this invention is the provision of a process whereby a mobile liquid, such as water, may be employed as a transporting medium for the loam, sand and gravel to be separated and sorted, so that as the gravel is transported it is freed from adhering loam and sand by the washing action of the liquid aided by the constant collisions between the bodies or stones making up the mass of the gravel, and the sliding and rubbing of the stones on and against the distributing tables forming a part of the apparatus selected by us to illustrate the operation of our process.

A further object of the invention is the provision of a process whereby by using a mobile liquid, such as water, as a transporting medium, the inclination to the horizontal of the successive distributing tables present in the apparatus which we have contrived to carry out our process is less than would be necessary in dry sorting and the main sorting screens at the lower end of each successive table may be of substantially the same inclination as the tables, and the inclination may be such that the oversize material on a particular screen tends to accumulate on that screen and so be washed by the passing and splashing liquid and then gradually forced or pushed over the lower edge of the screen.

A further object of the invention is the provision of a basin where the light suspended matter in the liquid transporting medium after emerging from the process may be allowed to settle and leave the supernatant liquid free and clear to be returned to the process.

A further object of the invention is the provision of a process whereby the volume of liquid transporting medium used to elevate the mixed material to the receiving station may be conveniently decreased in amount at the receiving station, if too great in volume for the mass of material delivered, and at the same time any gravel and sand removed by decreasing the volume of liquid transporting medium may be recovered and returned to the process.

A further object of the invention is the provision of a process whereby the liquid transporting medium is continually returned to the process after being used.

Other objects and advantages will appear as the description of the process and the particular physical embodiment of apparatus selected to illustrate the operation of the process, progresses, and the novel features of the invention will be particularly pointed out in the appended claims.

In describing the invention in detail, and the particular physical embodiment of apparatus selected to illustrate the operation of the process, reference will be had to the accompanying drawings wherein we have illustrated a preferred physical embodiment of apparatus selected to illustrate the operation of the process and wherein like characters of reference designate corresponding parts throughout the several views, and in which:

Figure 1, is a perspective view illustrating the complete layout of a plant for practicing our process; Fig. 2, is a plan view of a sorting structure proper, employed in carrying out our invention; Fig. 3, is a longitudinal elevational cross sectional view of the structure as illustrated in Fig. 2; Fig. 4, is a cross sectional elevational view on the planes indicated by the line IV—IV of Fig. 3, viewed in the direction of the arrows at the ends of the line; Fig. 5, is a cross sectional elevational view on the planes indicated by the line V—V of Fig. 3, viewed in the direction of the arrows at the ends of the line; Fig. 6, is an enlarged perspective detail of the arrangement and construction of apparatus at the receiving end of our table sorting structure.

A glacial moraine or gravel bank, is indicated at G in Fig. 1. As is well known to those skilled in this art, a gravel bank, as ordinarily understood, is made up of particles or bodies varying in size from very large boulders to extremely fine sand and in addition frequently has a stratum of loam and usually a top covering of greater or less thickness of earth or loam. For the purposes of description, in connection with our invention, it will be assumed that the material to be treated by our improved process consists of a mass composed of more or less of all of the above mentioned constituents.

It is well known to those skilled in the art, that at the present time there exists a large demand for what is known as gravel and sand for forming the aggregate in concrete structures of many kinds. It is also well known that this sand and gravel is desired free from loam and the gravel is demanded in masses, all of the bodies of such masses being of a size that is above a lower limit and below an upper limit and that these masses are desired in various grades, that is, a mass is desired, for instance, all of the bodies of which will pass through a screen having two inch square openings therein or round openings two and one quarter inches in diameter therein and will not pass through a screen having one inch square openings therein or one and one quarter inches in diameter circular openings therein. Such gravel would be known as one and one half inch gravel. There is, further, a demand for gravel known as three quarter inch gravel, which will pass through a screen having one inch square openings and will pass over a screen having one half inch square openings. There is further what is known as one quarter inch gravel which will pass through a screen having one half inch square openings therein but will pass over a screen having one quarter inch square openings therein. Material which will pass through a screen having one quarter inch square openings therein is generally considered as sand, but for some purposes, as for plasterer's and brick layer's mortar, it is necessary to have sand which is freed from the larger particles which would pass through a screen having one quarter inch square openings therein.

Heretofore the sorting of the material of the usual gravel bank generally has been accomplished by excavating material therein by the use of various excavating implements and arrangements and then elevating the same either before or after being put through crushers, to the top of a structure of some considerable height. After being so elevated the material is quite generally allowed to fall by gravity through a series of somewhat cylindrical revolving hollow screens, so arranged that the material which will not pass through the meshes of the first screen is delivered to the second screen and so on. The smallest material passes through the meshes of the first screen and the largest bodies emerge from the last screen of the series. During the process, jets of water are directed on to the material so as to wash it free from adhering sand and loam. This process requires a very considerable expenditure for constructing the plant initially and a further very considerable expenditure for maintenance and for operation due to the great amount of power consumed in rotating the screens and the excessive deterioration of the revolving screens and the mechanism between the screens and the prime mover furnishing the power.

Applicants purpose forming a cavity in the gravel bank as G, Fig. 1, of such depth that ground and surface water as W may both accumulate. Upon the water W is floated a scow S having a suitable source of motive power P positioned thereon and from this source of motive power, a shaft 1, extends to the centrifugal or other suitable form of pump 2. The pump inlet is designated 3, and is a pipe of suitable size and suitably and appropriately supported in a manner well known to those skilled in the art and extending down through the water W to the underlying gravel bank. The outlet or discharge end of the pump is designated 4, and communicates with a pipe 5, supported in any desired or most appropriate manner and extending to the top of the sorting structure proper, designated as a whole by T. It is well understood by those skilled in the art that structures and arrangements comparable to that designated by numerals 1 to 5, inclusive, and by letters P and S, are in use for purposes such as dredging rivers and like bodies of water, and applicants intend for such structure, to employ, in so far as they desire, all of the latest improved apparatus, arrangements and constructions. It is also well known by those skilled in the art that upon operating the pump 2, the mixed gravel material is sucked into the pipe 3 and discharged into the pipe 5 along with a quantity of water sufficient to fill the bore of the pipe 5. In an actual installation made by applicants, the pipe 5 has an internal bore of 12 inches and may be caused to deliver thirty five hundred gallons of water per minute at its upper discharge end. In an actual installation, applicants have arranged the pipe 5 from the point where it diverges from the horizontal at an angle of 22½ degrees to the horizontal.

In actual operation, the pipe 5 will be connected to the discharge end 4 by any suitable or appropriate means whereby considerable latitude of movement is allowed between the pipe 5, and pipe 4, as by a flexible connection or a flexible pipe, so that the scow may have considerable movement upwardly and downwardly and sideways, without putting any considerable strain upon the pipe 5; such means needs no illustration as it is old and well known in the art of dredging and involves nothing more or less than simple mechanical expedients.

The operation of the pump 2 can be made to wear away the gravel bank at any desired point by merely directing the inlet 3 to the point which it is desired to wear away, and in actual operation, by suitable manipulation of pipe 3 and by inserting suitable lengths of pipe 5 in the discharge end 4, the scow may advance over a very considerable range of territory surrounding the structure T, always floating upon the water which flows into the excavation which it has made itself.

As will be described hereinafter, in more detail, the water which is delivered to the structure T together with the gravel material, is substantially all returned to the pond or body of water upon which the scow floats so that the operation of the pump 2 does not result in exhausting the water even if that water is of a limited amount as it is being constantly returned to the place from which it was pumped.

The mixed water and gravel material forced through the pipe 5 is delivered to what we will term a receiving station designated by R and shown in detail in Fig. 6. By reference to Fig. 6, it will be seen that the pipe 5 is cut c it an angle at its upper delivery end. This angle in a specific installation as made by applicants, is that which would be given by starting the bevel 10 inches back from the end in the case of a 12 inch pipe which applicants actually use, thereby enabling the discharged material to sort of spread and fall more as a shower. The mixed gravel material and liquid medium or water, as it is delivered with some considerable velocity from the pipe 5, encounters the grizzly Z composed of bars somewhat T shaped with the top of the T presented to the end of the pipe. These bars are parallel one to the other and have a clear two inch or other suitable space between the nearest points and are positioned so that they are at an angle less than a right angle to the longitudinal center line of the pipe 5, that is, the angle A, Fig. 6, is less than a right angle and in an actual installation made by applicants, it is about forty seven degrees. The object of placing the bars of the grizzly Z at an angle other than a right angle to the longitudinal center line of the pipe 5, is to prevent as much as possible, the clogging of the grizzly Z by the delivered material. If this material were delivered normal to the surface of the grizzly Z and with considerable force, then those irregular bodies which might partly enter the spaces between the bars would be driven with great force between those bars and the following material would tend to drive the arrested material still more firmly between the bars of the grizzly, but when the material is not delivered normal to the surface of the grizzly, the material does not have the same tendency to clog the grizzly, and if any material does become temporarily lodged between the bars of the grizzly, then the succeeding material tends to free the arrested material as it is delivered not normal to the surface of the grizzly but at an angle thereto such that the material tends to slide along the bars of the grizzly and so become freed if it does not pass therethrough. The bars of the grizzly, as hereinbefore stated, are not rectangular in cross sections but approximate somewhat to a T in cross section except that the angles between the vertical and the horizontal limbs of the T may be considered to be filled into some extent, that is they are somewhat arrow shaped. This construction of bar has been selected so as to further prevent a clogging of the grizzly Z. With this construction of bar, if material succeeds in passing those portions which most closely approach the exit end of pipe 5, then its further progress is assured because it then enters a space of greater dimensions and if a body does not succeed immediately in passing the most restricted opening between the bars, then it is swept along by the following material down the face of the grizzly and away therefrom. In a particular installation made by applicants, adjacent bars of the grizzly at their nearest points are two inches apart because that is the upper limit for the largest size gravel which applicants desire to obtain at that particular plant. Of course the spacing of the bars of the grizzly depends entirely upon the upper limit of size of the largest size material which it is desired to sort.

Material which does not pass through the grizzly Z falls on to the screen 6. This material thus falling onto the screen 6, may still contain bodies which will pass through a screen having two inch square openings therein so that it is allowed to roll by gravity down the screen 6 to the end that it will drop through screen 6. In order to facilitate this action pivoted baffles 7 and 8 are positioned just above the screen 6 to retard the too rapid progress of the material down along the screen 6. As the material accumulates on the upper side of the baffles as 7 and 8, it forces those baffles aside and in the one case moves on to baffle 8 and in the other case moves on to the exit end of the screen 6.

It must be understood that the one great object of applicants is to obtain salable material and to obtain every ton or cubic yard of material possible from a given mass of elevated material, that is, if the upper limit of the material which is salable is that which will pass through a screen having two inch square openings therein or through a screen having circular openings two and one quarter inches in diameter, then the object is to recover from the material delivered at the receiving station every last stone which by any possible means may be made to pass freely through either one of such screens and in considering this question, it must be remembered that certain stones are so shaped that when delivered in certain ways on a screen having two inch square openings therein, they will not pass therethrough but the same stone may well pass through a screen having circular openings two and one quarter inches in diameter or vice versa, so that all material should be given every possible chance to pass through a limit screen before being rejected to fall into what may be called the discard or oversize bin. Due to these considerations, applicants position a vertical screen 9 back of the grizzly Z which screen has circular openings therein, two and one quarter inches in diameter. The material which passes through the grizzly Z is allowed to strike the screen 9 and pass therethrough if it will do so, but if it does not, it falls onto the upper end of the screen 6 and it may immediately pass therethrough, but if it does not immediately pass therethrough, it rolls down the screen 6 and is arrested at two points therein, once by baffle 7 and again by baffle 8, and not until then, does it fall over the exit end of screen 6. All material which rolls off screen 6, drops into a chute 10 which terminates, as best shown in Fig. 3, at the upper left hand end thereof, in a bottom 11. The material falling down the chute 10 lands on the bottom 11, accumulates there so as to absorb the shock of further falling material and prevent too rapid deterioration of the bottom 11, and when sufficiently accumulated rolls off on to the sloping deck 12, then down that deck onto the screen 13, being arrested in its motion by the baffles 14, 15 and 16. All material which passes over screen 13, drops into deflector 17, and when sufficient material has accumulated therein, further material rolls off onto screen 18, and is arrested in its downward movement by pivoted baffles 19, 20 and 21. All material which passes over screen 18 falls into chute 22 and from the chute 22 drops into the discard bin 23. The material which passes through screen 18 drops directly into the bin 24 which in the actual installation to which reference is being made throughout this specification, and by reason of the sizes of screens specified, may be considered to be the bin for the one and one half inch gravel. Material which passes through screen 13, drops upon the receiving platform 25 also well shown in Fig. 4, in which figure may also be seen the sloping construction of receiving platform 25 constructed to the end that all material which drops thereon will slide off into the bin 24.

From the hereinbefore given description, it will now be understood that the only material which gets into the discard bin 23 is that which has had every opportunity to pass through a limiting screen but has failed to do so, that is, it has had opportunity to pass through the screen 9 having circular openings therein, two and one quarter inches in diameter, it has had an opportunity to pass through the screen 6 having square openings therein two inches in diameter and it has had an opportunity to pass through screens 13 and 18 each having two inch square openings therein. We desire to further point out that all of the material which rolls down the screen 6 is not only retarded in a too rapid descent by the baffles 7 and 8, so as to gain a better opportunity to fall through the openings in the screen 6, but this material being somewhat temporarily held at baffles 7 and 8 and passing somewhat slowly over the screen 6 is by the water issuing from pipe 5, quite thoroughly washed from all loam and sand adhering thereto so that the baffles 7 and 8 not only serve to arrest the momentum of the material rolling down the screen 6, to enable that material to gain a better opportunity to pass through the openings of the screen 6, but the baffles 7 and 8 also serve to arrest the material so that it may be washed the more thoroughly by the liquid transporting medium or water flowing from the pipe 5, all to the end that the material which rolls over the exit end of screen 6 and which thereafter rolls over screens 13 and 18 and falls directly into the bin 24 may be entirely free from sand and loam and all sand which is delivered by pipe 5 will fall through screen 6 and none be carried with the discarded material to the discard bin 23, as it is obvious that all sand which reaches the bin 23 is practically lost as a salable commodity, that is, applicants desire not only to recover from the material delivered from pipe 5 every last stone which may be made to pass through an upper limit screen, but also every grain of sand delivered by pipe 5 and to recover that grain of sand not mixed with discarded boulders but in its proper place together with the other grains of sand.

All material which passes through screens 9 and 6 falls upon the table 25' best shown perhaps in Fig. 3, and also in Fig. 4. All of this material is below the upper limit of size and all is salable except for the liquid transporting medium or water, and the loam which may be mixed therewith. The further operations consist in separating this material delivered onto the table 25' into graded sand and graded gravel and separating the water and loam therefrom.

In an actual installation, applicants have found that screens 6, 13, and 18, function best at an angle of about forty-two and one-half degrees to the horizontal and screen 9 at an angle of ninety degrees or vertical.

The table 25' is not horizontal but slopes downwardly to the right as viewed in Fig. 3, at a pitch of about one half inch to the foot, that is at a much less angle to the horizontal than the critical angle of flow of the dry material. All of the material dropped onto the left hand end of table 25', as viewed in Fig. 3, is washed by the liquid transporting medium toward the right, that is, to the lower end of the table and onto a screen 26 forming practically a continuation of the table. Although the water upon the table 25' may be several inches in depth and may appear to flow with great rapidity, nevertheless, the quantity of water and the quantity of material is to be arranged in such proportions and the slope of table 25' is to be such that the transported material must not practically instantly pass over the screen 26, but the arrangements must be such that the large material which does not pass through screen 26 will sort of accumulate on the lower portion, say the lower one half portion, of the screen 26, and be gradually forced over the lower edge of screen 26 by the impact of the following material, to the end, that all material which does finally pass over the end of the screen 26 is thoroughly washed by the splashing water of all adhering sand and loam and given ample opportunity to pass through screen 26 before being forced over the lower end of screen 26. From the material which passes over screen 26 is derived the mass which constitutes, what, for specific illustration, we will designate as the one and one half inch gravel, so before this material enters its proper bin, it is dry screened by screens 27 and 28 to further insure proper sorting. A splash board 30 is positioned just beyond the lower end of screen 26 so that any water which splashes below the lower end of screen 26 strikes the splash board 30 and is thus directed downwardly straight through the screen 27, so that beyond the splash board 30, the material is not subjected to washing. It is also true that screen 28 is in effect a dry screen.

The screens 28 are arranged in the same manner as the screens 31, best shown in Fig. 5, and between each of the screens, as 28, corresponding to screens as 31, of Fig. 5, is a deflector, which just as the deflector 32 serves to prevent material falling from screen 42, from dropping directly into the chutes as 45, forces the material to first pass over the screens as 28.

In an actual installation as hereinbefore referred to, applicants have formed the screens 26, 27 and 28 with one inch square openings therein and have positioned screens 27 and 28 at an angle of 35 to 40 degrees to the horizontal.

The material and liquid transporting medium passing through screens 26, 27 and 28 falls upon the table 33 which like the table 25' is pitched about one half inch to the foot and terminates in the screen 34 which has a splash board 35 positioned just below its lower end and has the screen 36 corresponding to screen 27 to receive material pushed over the lower end of screen 34 and the screen 37 is positioned exactly like the screen 28 to receive material from the screen 36. The material which passes over screens 34, 36 and 37 drops into the chute 38 and falls into the bin 39. All material which falls into the bin 39 is what we designate three quarter inch gravel, intermediate size gravel, or specifically three quarter inch gravel, because screens 34, 36 and 37, are arranged and constructed and function exactly as do the screens 26, 27 and 28, except that screen 34 has one half inch square openings therein and the screens 36 and 37 have rectangular openings having a transverse dimension of one half inch and a dimension the other way of three quarters of an inch in an actually constructed plant.

All material passing through screens 34, 36 and 37 falls upon the table 40 and is transported by the liquid medium to the lower end of the table and onto the screens 41, 42 and 31 arranged and constructed and functioning in the same way the screens 26, 27 and 28 are arranged and constructed and function. The splash board 44 is also constructed and arranged beyond the end of screen 41 in the same way as the splash board 30 is positioned beyond the end of screen 26. All material which passes over screens 41, 42 and 31, drops through the chute 45 into the bin 46 and the mass of material collecting in the bin 46, we designate as the small gravel or one quarter inch or pea gravel because screen 41 has rectangular openings therein of a transverse dimension of one quarter of an inch and the other dimension of one half of an inch, and the screens 42 and 31 are formed with like openings.

All material passing through screens 41, 42 and 31, falls upon the table 43, and is transported by the water along the table 43, which is pitched about one half of an inch to the foot, and falls into tanks as 47, 48, 49 and 50, best shown in plan in Fig. 2, and in cross sectional elevation in Fig. 3. These tanks are formed in the shape of the frustum of an inverted pyramid and transversely of each tank is an adjustable baffle plate as 51, best shown in cross sectional elevation in Fig. 3. The liquid transporting medium bearing suspended sand and loam flows into the tanks as 47 to 50, inclusive, and passing down and around the baffle 51, is free to flow from the tanks over the lower edges thereof as 52, but in passing into and down the tank the larger heavier particles of material in suspension in the water, drop to the bottom of the tanks as 47 to 50, inclusive, and only the lighter material flows with the water out over the edges as 52 of the tanks, this being virtually a settling process. As the heavier particles or coarse sand accumulate in the tanks as 47, the level of the water in the tanks raises and in so doing causes a float as 53, in a float chamber as 54, to rise. This float is attached by the two arm lever 55 pivoted at 56 to the rod 57 which extends down through a tubular member 58 and through the side of the tank to a lever 59, pivoted at 60. Intermediate the pivot 60 and the rod 57 is positioned a closure 61 for the lower orifice of the tank as 47. When sufficient material has accumulated in a tank as 47, to cause the float as 53 to rise, the lever 60 is forced downwardly moving the closure 61 from the lower orifice of a tank as 47, and so allowing a certain amount of the collected coarse sand to flow from the orifice into a receiving car 62 positioned below the orifice until the level of the water has been reduced sufficiently to allow the float 53 to fall enough to again close the lower orifice of a tank as 47. In practice the orifice at the lower end of a tank as 47 is practically continuously discharging a greater or less volume of coarse sand.

The transporting medium as water, which flows over the edges as 52, runs down the inclined slope 63 and into a trough 64. If a larger volume is delivered than may be contained in trough 64, then it flows over the partition 65 into the trough 66. By reference to Fig. 2, it will be seen that the troughs 64 and 66 extend transversely of the end of the table structure. All of the liquid transporting medium or water which flows into the troughs 64 and 66 may be allowed to flow into the enlargement 67 and thence into the discharge trough 68 and flow to a settling basin hereinafter more fully described. The over-flow from the tanks as 47 to 50, inclusive, in the case of the structure specifically described, would contain not only the loam originally raised to the receiving station R along with the gravel, but would also contain a somewhat large quantity of quite fine sand. Of course all of this overflow could be put through another set of tanks identical with 47 to 50, inclusive, as is obvious, but applicants governed at present by the the demand for fine sand, recover only a part of the fine sand carried along with the overflow from the tanks 47 to 50, inclusive. Applicants' method and apparatus for doing this, is shown particularly, in Fig. 2. In the bottom of the trough 64, slit 68 is formed, and in the bottom of the trough 66, slit 69 is formed. As the liquid transporting medium travels along the troughs 64 and 66, a certain amount falls through the slits 68 and 69. An inclined baffle as 70, best shown in Fig. 3, is placed in trough 66, just above the slit 69 in the direction of flow and an inclined baffle as 71 is positioned in trough 64 just above the slit 68, the right hand end of which, as it would be viewed in Fig. 2, being shown in Fig. 3. The slits 68 and 69 together with their baffles are made of such proportions that the requisite amount or volume of the liquid transporting medium or water is directed therethrough. All of the water which passes through the slits 68 and 69, bearing the fine sand, drops onto table 72 and then flows into the tank 73, constructed and arranged just as are the tanks 47 to 50, and passing down and below the baffle 74 therein flows out at the edge 75 and then into the trough 76 communicating with trough 68. The rate of flow through the tank 73, by reason of the volume delivered thereto, and the position of the baffle 74 therein, causes the fine particles of sand in the transporting medium to settle into the bottom of the tank 73 and only the lightest suspended material such as loam, flows over the edge 75. The tank 73 just like the tanks 47 to 50, inclusive, is arranged with a discharge apparatus including a closure as 61 as shown in connection with tank 47 and in operation there is a practically continuous stream of fine sand flowing from the bottom of tank 73 after it once becomes filled to a certain height with sand.

The transporting medium overflowing from tanks 47 to 50, which does not go through tank 73, and that portion which does go through tank 73, and overflows into trough 76, combine and flow in trough 68 to a settling basin B. This settling basin receives the overflow at one end, and preferably at the other end thereof or at a point quite remote is placed a weir 77 preferably arranged at such height that the rapidity of flow thereover will be such that practically all, if not all, of the suspended light particles in the overflow water delivered from trough 68 will have settled to the bottom of the basin B before the water will have arrived at the weir 77. The water which overflows the weir 77 is transported by any usual or appropriate or desired means as by a tough 78 to the depression where the scow S is floated on the water W. The purpose of returning the water to the depression where the scow S is operating is quite obvious. The operation of the centrifugal pump 2 necessarily exhausts a very considerable portion of the water W as it operates, and as the ground and surface water flowing into the depression in which the scow S is situated, may be easily insufficient to constantly supply the pump 2, it might become within a very short time quite impossible to operate the plant on account of the lack of water. Of course if there is an abundant supply of water flowing into the depression in which the scow S is situated, then, it may be unnecessary to make use of the settling basin B and return the overflow water to the depression in which the scow S is situated. It is well known to those skilled in this art, however, that there is generally insufficient water in the usual gravel pit to constantly supply a pump discharging thirty five hundred gallons per minute unless the discharge water is again brought back, by some means, to the inlet end of the pump and it would also be easily understood that if the gravel contained a very large proportion of loam, it would be quite impossible to return the overflow water running through the trough 68 directly to the depression in which the scow S is positioned because the water would soon become so loaded with loam that its efficiency as a washing agent for the gravel while passing over the several tables would be very seriously diminished. It is therefore quite apparent that the provision for returning the water from the process to the inlet end of the pump and the provision of a settling basin to separate the loam from the water before arriving at the inlet of the pump are both most important features of this process, and features which in certain situations would be absolutely indispensable as a part of the process and without which the process could not be carried out. It is of course true that in certain situations, that is, where the gravel material is drawn from the bed of a large flowing stream, that it would be unnecessary to make any particular provision for directing the overflow water back into the stream and of course in such case no settling basin such as B would be necessary and it is also true that in certain situations the nature of the gravel might be such that the overflow water coming from the process would be so free from suspended matter that it could be led directly into the depression in which the scow S is positioned. Although all of the above suggested methods of operating are contemplated by applicants nevertheless, applicants have illustrated specifically by Fig. 1, that condition which might be called the most difficult and the one which requires the extreme of inventive ability to cope with, that is, the condition in which the ground and surface water is insufficient to constantly supply the pipe 2, unless water is returned to the inlet, and in which the fine loamy material is in such quantity, that the water discharged through the trough 68 must be run into a settling basin before being again returned to the process.

It of course, must be realized that the material in a gravel bank is deposited not at all uniformly, so that the proportions of solid and liquid material discharged from the pipe 5, are often such that the liquid is in excessive amount, so much so, that it interferes with the proper operation of the process in that too large a volume of water or liquid flows through the tanks as 47 to 50, inclusive, and consequently the proper settling of the sand in these tanks is interfered with. Applicants have provided a means for taking care of this condition. Applicants have provided a screen 79 back of screen 9. This screen has openings therein of such size that only small material will pass therethrough, say nothing larger than quarter inch material. Back of this screen 79 is a trough 80. The material delivered through the pipe 5, passes through the grizzly Z, screen 9, and if small enough, through the screen 79 and lands in the trough 80. The upper end of the trough 80 is surrounded by the structure comprising the side wall 81, the side wall 82, and the top 83, and an end wall 43, shown in Fig. 4, so that the upper end of the trough soon fills and runs over. All water which runs over from the upper end of the trough 80, falls upon the table 25' and so passes through exactly the same process as has been hereinbefore described. If too much water in proportion to material is being supplied, however, the slide 84 is raised allowing water and material contained therein in the upper end of the trough 80 to flow through the slot 85 and along the trough 80. The amount which may be allowed to flow along the trough 80 is regulated of course, by the extent of opening of slot 85 by the adjustment of slide 84, so that a greater or less amount of the water and fine material which passes through screen 79 may be allowed to flow along trough 80, and this amount would be regulated by the necessary amount of water which it is desired to remove from the regular process. The material which flows along the trough 80 flows into the tank 86, under and around the baffle 87, and then over the lower edge into the trough 88, which as perhaps best seen in Fig. 5, communicates by means of a conduit 89 with the trough 68. The passage of the liquid transporting medium through the tank 86 causes the sand and small gravel to be deposited in the tank 86 and when desired this material is dropped onto the table 40 by an operation of lever 90 which causes an orifice in the bottom of the tank to be opened. By the means just described, the quantity of water when too great in amount, is decreased, but nevertheless, the salable material transported by the water is removed by a settling tank as 86 and then returned to the process at a proper point, so that none of the salable material is lost. By reference to Fig. 1, it will be seen that under each of the bins 24, 39 and 46, is positioned a railway track as 91, 92 and 93. Under the tanks 47 to 50, inclusive, which are positioned in line, is located a track 94, and under the tank 73, is positioned a railway track 95. Each of the bins 24, 39 and 46, as best shown in Fig. 3, is constructed with sloping sides and with an orifice at its lower end closed by a slide as 96 operated by a rod as 97, so that a car may be positioned underneath a bin and then an operator by operation of rod 97 may move a slide as 96 in the bottom of a bin as 24, and cause the collected material therein to run into the car. As the tanks 47 to 50, inclusive, are practically continuously discharging while the plant is in operation, cars are always positioned underneath these tanks to receive the discharged material and this is also true of the tank 73.

From the hereinbefore given description, it will now be understood that applicants' process provides a method whereby the gravel of the ordinary gravel bank may be elevated to a receiving station on a structure and then without further power being applied thereto or expended in any way, it may be sorted into several grades of clean gravel and of clean sand, and the sorted material delivered directly into transporting vehicles.

Although in describing our improved process, for the purposes of illustration, we have specified a particular classification of the gravel material, as into one and one half inch, three quarter inch, and one quarter inch gravel, and coarse sand and fine sand, and in order to accomplish this classification, we have specified particular specific dimensions of screens and particular specific angles of inclination of tables and screens, nevertheless, we desire to have it understood that the process is applicable for the classification of gravel material into a greater number of grades and sizes varying between different limits and the screen inclinations and the table inclinations are not to be considered as the only ones possible as these may be varied depending upon the specific volume of transporting medium delivered at the receiving station and the usual proportions of solid material and medium in that which is delivered and readiness of flow of the material.

Although we have particularly described one particular physical embodiment of means for practicing our process, nevertheless, we desire to have it understood that this means is merely illustrative and does not exhaust the possible physical embodiments of means by which the principles of our process may be practiced.

What we claim as new and desire to secure by Letters Patent of the United States, is:

1. The process of sorting a mass of heterogeneous material which consists in elevating the material mixed with a liquid, discharging the material and liquid, separating oversize material, thoroughly washing the oversize material with the discharged liquid, combining the entire washings with the main mass and then dry screening the oversize material to remove any possible proper size material wanted.

2. The process of sorting a mass of heterogeneous material which consists in elevating the material mixed with a liquid, discharging the material and liquid, segregating and thoroughly washing oversize material, then flowing the main mass and the washings downward by gravity and separating and thoroughly washing a mass of upper limit material.

3. The process of sorting a mass of heterogeneous material which consists in elevating the material mixed with a liquid, discharging the material and liquid, segregating and thoroughly washing oversize material, then flowing the main mass and the washings downwardly by gravity, separating and thoroughly washing a mass of upper limit material, then flowing the residue and the washings downwardly by gravity and separating and thoroughly washing an intermediate limit material.

4. The process of sorting a mass of heterogeneous material which consists in elevating the material mixed with a liquid, discharging the material and liquid, segregating and thoroughly washing oversize material, then flowing the main mass and the washings downwardly by gravity, separating and thoroughly washing a mass of upper limit material, then flowing the residue and the washings downwardly by gravity and separating and thoroughly washing an intermediate limit material, then flowing the remaining residue and washings downwardly by gravity and separating and thoroughly washing a lower limit material and then treating the last remaining residue and the last obtained washings to recover, thoroughly washed, masses of material below the lower limit.

5. The process of sorting a mass of heterogeneous material which consists in elevating the material mixed with a liquid, discharging the material and liquid, segregating and thoroughly washing oversize material, then flowing the main mass and the washings downwardly by gravity, separating and thoroughly washing a mass of upper limit material, then flowing the residue and the washings downwardly by gravity and separating and thoroughly washing an intermediate limit material, then flowing the remaining residue and washings downwardly by gravity and separating and thoroughly washing a lower limit material, then flowing the remaining residue and washings downwardly by gravity and separating and thoroughly washing a lower limit material, then separating the coarser particles from the last obtained residue and last washings by rapid settling.

6. The process of sorting a mass of heterogeneous material which consists in elevating the material mixed with a liquid, discharging the material and liquid, segregating and thoroughly washing oversize material, then flowing the main mass the washings downwardly by gravity, separating and thoroughly washing a mass of upper limit material, then flowing the residue and the washings downwardly by gravity and separating and thoroughly washing an intermediate limit material, then flowing the remaining residue and washings downwardly by gravity and separating and thoroughly washing a lower limit material, then flowing the remaining residue and washings downwardly by gravity and separating and thoroughly washing a lower limit material, then separating the coarser particles from the last obtained residue and last washings by rapid settling, then separating finer particles from the residue by a further not so rapid settling.

7. The process of sorting a mass of heterogeneous material which consists in elevating the material mixed with a liquid, discharging the material and liquid, segregating and thoroughly washing oversize material, then flowing the main mass and the washings downwardly by gravity, separating and thoroughly washing a mass of upper limit material, then flowing the residue and the washings downwardly by gravity and separating and thoroughly washing an intermediate limit material, then flowing the remaining residue and washings downwardly by gravity and separating and thoroughly washing a lower limit material, then flowing the remaining residue and washings downwardly by gravity and separating and thoroughly washing a lower limit material, then separating the coarser particles from the last obtained residue and last washings by rapid settling, then separating finer particles from the residue by a further not so rapid settling, then allowing the liquid containing the lightest material to become so quiescent that such lightest material substantially all settles and conducting the supernatant liquid to material to be sorted to be again elevated with said material.

8. The process of sorting a mass or heterogeneous material which consists in elevating the same with a liquid as a transporting medium, separating part of the liquid and finer material from the rest, separating the finer material so separated from the liquid and then combining this finer material with the original mass of material and liquid from which it was first separated.

9. In a gravel sorter, in combination: a discharge pipe; means for discharging mixed water and gravel therefrom; a grizzly positioned adjacent the discharge end of the pipe and at an angle less than a right angle to the longitudinal center line of the pipe; a vertical screen having circular openings therein adjacent the grizzly but more remote from the pipe but in the range of the discharge from the pipe; another screen having square openings therein positioned beneath the grizzly and the first said screen and the discharge end of the pipe, said screen being inclined to the horizontal whereby gravel will roll downwardly thereon.

10. In a gravel sorter, in combination: a discharge pipe; means for discharging mixed water and gravel therefrom; a grizzly positioned adjacent the discharge end of the pipe and at an angle less than a right angle to the longitudinal center line of the pipe; a vertical screen having circular openings therein adjacent the grizzly but more remote from the pipe but in the range of the discharge from the pipe; another screen having square openings therein positioned beneath the grizzly, the first said screen and the discharge end of the pipe, said screen being inclined to the horizontal whereby gravel will roll downwardly thereon and pivoted baffles having their free ends adjacent the last mentioned screen of such weight that material rolling down the last mentioned screen will be temporarily arrested.

FREDERICK W. SCHMIDT.
WILLIAM M. GREEN.